Aug. 14, 1945.   C. D. PETERSON ET AL   2,382,331
OVERRUNNING CLUTCH CONSTRUCTION
Filed Sept. 10, 1942
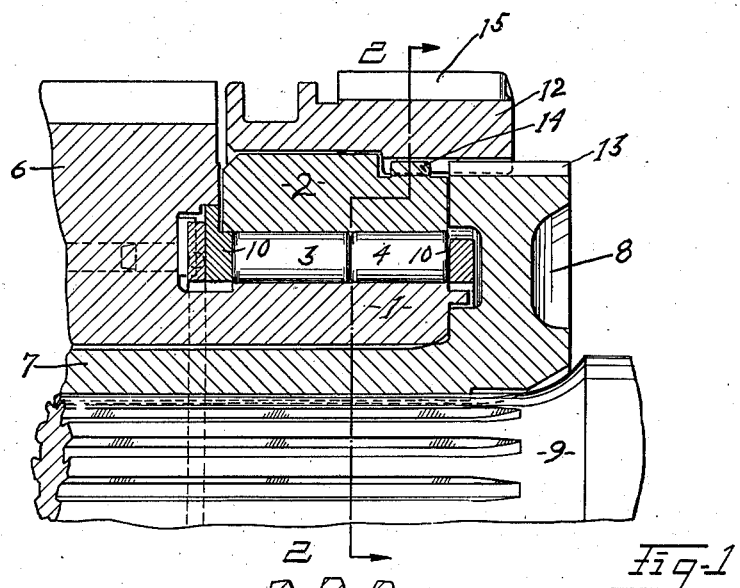
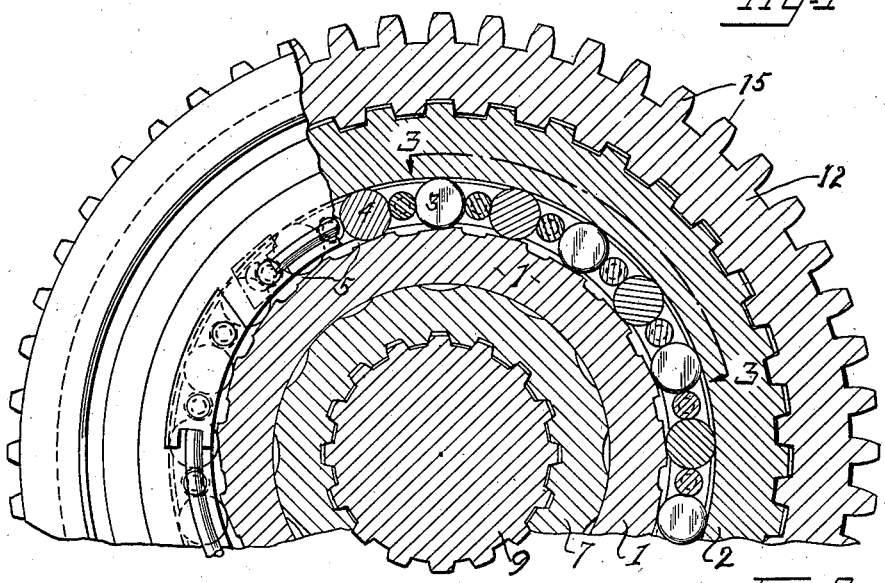
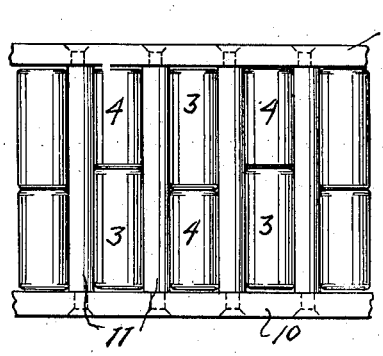
INVENTORS
Carl D. Peterson
Albert H. Deimel
BY
Bodell & Thompson
Att'ys Patented Aug. 14, 1945

2,382,331

UNITED STATES PATENT OFFICE 2,382,331

OVERRUNNING CLUTCH CONSTRUCTION

Carl D. Peterson and Albert H. Deimel, Toledo, Ohio

Application September 10, 1942, Serial No. 457,864

4 Claims. (Cl. 192—45)

This invention relates to free wheeling or overrunning clutches used in transmission gearings to permit an output shaft to overrun a lower gear ratio when a shift is made into a higher gear ratio, and has for its object a clutch embodying comparatively long rollers composed of sections arranged end to end, so that the sections may adjust themselves to slight axial misalinements and the rollers coact evenly throughout their length with the races, and particularly with the cams of the cam race.

The invention further has for its object an overrunning clutch of the general type shown in Patent Number 2,247,713 issued July 1, 1941, in which a clutch collar, provided with internal splines, is shiftable to clutch the outer race of the overrunning clutch to a clutch gear, the clutch collar acting in conjunction with the sectional rollers to compensate for axial misalinements.

The invention further has for its object the arrangement or assembly of an overrunning clutch with a drive gear and a clutch gear through which the motion is transmitted to on output shaft.

The invention consists in the novel features and in the combinations and constructions hereinafter set forth and claimed.

In describing this invention, reference is had to the accompanying drawing in which like characters designate corresponding parts in all the views.

Figure 1 is a fragmentary longitudinal sectional view of a transmission mechanism embodying this invention.

Figure 2 is an enlarged sectional view, partly in elevation, taken approximately on the plane of line 2—2, Figure 1.

Figure 3 is a fragmentary edge view of the cage for the rollers of the clutch.

This overrunnnig clutch construction includes, generally, inner and outer races, one of which is provided with cams, and rollers between the races, each roller consisting of a plurality of sections, here shown as two, arranged end to end. The sections are of different length, and each roller is arranged with its longer section alternating with the shorter section of the adjacent rollers.

1 and 2 designate the inner and outer races of an overrunning clutch; 3 and 4 the sections of each roller. The inner race 1 is here illustrated as provided with peripheral cams 5 coacting with the rollers, and the inner race is here shown as the hub or extension of the hub of a gear 6 through which the driving power is transmitted, the gear 6 being rotatable about the hub 7 of a clutch gear 8 splined on the output shaft 9. The overrunning clutch is thus interposed between opposing spaced-apart faces of the gears 6 and 8. As seen in Figure 3, the longer section 3 of each roller alternates with the shorter section 4 of the adjacent rollers. This arrangement prevents uneven wear on the races and the wearing grooves in the races. The rollers are mounted in a suitable cage 10, which includes spacers 11 extending betwen the rollers.

12 is a clutch collar formed with internal splines for coacting with splines or teeth 13 on the clutch gear 8 and with peripheral teeth or splines 14 on the outer race 2, the collar being shiftable axially to shift its internal splines into and out of interlocking engagement with the teeth or splines 14 of the outer race. This collar is also provided with peripheral gear teeth 15. The splines coact with a slight looseness to compensate for axial misalinements, as in Patent Number 2,247,713, and also cooperate with the sectional rollers, to facilitate the cams 5 and the rollers engaging evenly throughout the comparatively long axial width of the cams. Thus, the driving force is distributed throughout all the rollers and evenly throughout the length of each roller. When the clutch collar 12 is shifted, so that its splines interlock with the splines or teeth 14 of the outer race 2, the motion is transmitted from the gear 6 to the inner race 1 and rollers to the outer race 2, thence to the clutch gear 13 to the output shaft 9. It is also possible with the same construction to reverse the motion, the former driver now becoming the driven member by at the same time reversing the direction of rotation.

Owing to the sectional rollers, the rollers have slight compensating action, which permit them to coact with the cams 5 substantially evenly throughout the axial width of the cams, and this operation combined with the compensating effect of the collar 12 compensates for all slight misalinements that occur or might develop between the gear 6, output shaft 9 and interposed parts.

What we claim is:

1. In a power transmission unit, the combination of a shaft, a clutch gear rotatable with the shaft, an overrunning clutch comprising an inner raceway, an outer raceway, and rollers between the raceways, and means for driving one of the raceways, a clutch collar enclosing the clutch gear and the outer raceway and shiftable into and out of position to clutch the outer raceway and the clutch gear together and serving as a coupling to compensate for axial misalinements and eccentricities between the clutch gear and the outer raceway, each roller of the clutch consisting of a plurality of long and short sections arranged end to end and abutting against each other, the long section of each roller alternating with the short sections of the adjacent rollers, for facilitating the compensation for axial misalinements of the inner and outer raceways and the clutch gear.

2. A transmission unit including a shaft, a clutch gear mounted on the shaft and having a hub extending along the shaft, a driving gear rotatably mounted on said hub and having a hub extending toward the clutch gear and constituting the inner cam race of an overrunning clutch, an outer race having clutch teeth, and rollers between the races, and a clutch collar slidably splined on the clutch gear and shiftable axially into and out of engagement with said clutch teeth on the outer race.

3. A transmission unit including a shaft, a clutch gear mounted on the shaft and having a hub extending along the shaft, a driving gear rotatably mounted on said hub and having a hub extending toward the clutch gear and constituting the inner cam race of an overrunning clutch, an outer race having clutch teeth, and rollers between the races, each roller consisting of two sections arranged end to end, and a clutch collar slidably splined on the clutch gear and shiftable axially into and out of engagement with said clutch teeth on the outer race.

4. A transmission unit including a shaft, a clutch gear mounted on the shaft and having a hub extending along the shaft, a driving gear rotatably mounted on said hub and having a hub extending toward the clutch gear and constituting the inner cam race of an overrunning clutch, an outer race having clutch teeth, and rollers between the the races, each roller consisting of two sections arranged end to end, one section being longer than the other, and the longer section of each roller alternating with the shorter sections of the adjacent rollers, and a clutch collar slidably splined on the clutch gear and shiftable axially into and out of engagement with said clutch teeth on the outer race.

CARL D. PETERSON.
ALBERT H. DEIMEL.